United States Patent Office 3,386,991
Patented June 4, 1968

3,386,991
PROCESS FOR REDUCING ORGANIC NITROGEN OXIDES TO AMINES USING IRON AND ACTIVE CARBON IN A SOLVENT
Samuel Michael Gerber, Martinsville, N.J., assignor to American Cyanamid Company, Stamford, Conn., a corporation of Maine
No Drawing. Filed May 26, 1965, Ser. No. 459,095
3 Claims. (Cl. 260—156)

ABSTRACT OF THE DISCLOSURE

Organic nitrogen oxide compounds are reduced to the corresponding amine compounds by refluxing a water or aqueous lower alkanol solution thereof containing defined proportions of suspended iron and activated carbon particles for a time to effect the reduction reaction.

---

This invention relates to an improved process for the reduction of organic nitrogen monoxides and dioxides to their corresponding amines.

It is the primary object of the invention to provide a process whereby the rate of reduction of organic nitrogen oxides is greatly increased.

It is a further object to provide a process whereby organic nitrogen oxides containing groups having lower reduction potentials than N-oxide groups, such as azo groups, can be reduced to their corresponding amines in high yield.

Other and further objects of the invention will be apparent from the following description.

As is well known, prior art methods of reduction, such as the use of iron particles and dilute acid, or catalytic hydrogenation using palladium-on-charcoal catalyst, cannot be used to reduce azo-containing organic nitrogen oxides since they reduce the azo group as well. The mildest possible iron-acid reduction, in the case of an azopyridine N-oxide, in the absence of carbon, gives less than 30% yield of the desired azo amine, the remaining azo pyridine N-oxide being completely reduced to the respective amine fragments. On the other hand, mild reducing methods which preserve the azo group, either take a very long time, or, are laboratory methods not suited to industrial scale-up where hazardous or expensive chemicals should be avoided and very high temperatures are inconvenient.

In accordance with this invention it has now been found that the reduction of organic nitrogen oxides generally can be greatly accelerated by carrying out the reaction in the presence of iron and carbon particles in a solvent medium. At the same time, in accordance with the invention, organic nitrogen oxides containing vulnerable groups, such as azo groups, are reduced to their corresponding amines without any significant reduction of these groups so that the desired amine products are obtained in substantially 100% yield.

Organic nitrogen monoxides and dioxides which may be reduced in accordance with the invention include the following:

(1) Heterocyclic nitrogen monoxides, such as pyridine-1-oxide, quinoline-1-oxide and their derivatives such as alkyl, alkoxy, halogeno, methylsulfonyl, sulfonic acid and the like; also 2-arylazo derivatives of the above such as 2-phenylazo, 2-p-methoxyphenylazo, 2-naphthylazo, 2-(3-methylphenyl)azo, 2-p-dimethylaminophenylazo and biphenylylazo.

(2) Heterocyclic nitrogen dioxides, such as phenazine dioxide, quinoxaline dioxide, 4-nitropyridine and 4-nitroquinoline.

(3) Aromatic nitrogen monoxides, such as nitrosobenzene, nitrosonaphthalene and their derivatives, such as 4-(dialkylamino)-nitrosobenzene, p-nitrosophenol and 1-nitroso-2-naphthol and nitrosopyrrole.

(4) Aromatic nitrogen dioxides, such as nitrobenzene and its many important derivatives used as dye intermediates such as the chloronitrobenzenes, nitrophenetidines, nitrobenzenesulfonic acids, 1- and 2-nitronaphthalene and their mono and disulfonic acids, dinitrosobenzenes and their chloro derivatives, 1-nitroanthraquinone, 1,5-dinitroanthraquinone, 1,8-dinitroanthraquinone and their halogen, sulfonic acid and hydroxy derivatives.

In practicing the process of the invention, the organic nitrogen oxide to be reduced is dissolved in a suitable solvent, preferably a hydroxylic solvent, such as water or aqueous alcohol, the iron and carbon particles are added and the mixture stirred and heated until the reduction is complete. The heating temperature is preferably the reflux temperature of the solvent, although somewhat lower temperatures may be used. Preferably, the mixture is not heated until efficient stirring is established.

The iron used may be ground chemical iron of 40 to 325 mesh, or steel wool. Commercial grade 60-mesh iron is satisfactory. From about one to five moles of available iron are needed per mole of oxygen to be deoxygenated or reduced. However, an excess of iron may also be used.

Activated carbon is preferred for the process of this invention. As shown in Example 6, graphite is less effective. Any high quality activated carbon may be used. The amount of carbon used is preferably 4% based on the weight of the N-oxide to be reduced. The amount, however, may be 1–20% carbon or more. Carbon greatly accelerates the rate of reduction, which makes its use unique. Without carbon, as can be seen by Examples 2 and 3, reduction is much slower. Carbon in itself is not a reducing agent for the nitrogen oxide used as the starting material in the process of this invention as shown in Example 3.

For the reduction of organic N-oxide compounds containing azo groups, the solvent preferred is 30–35% ethanol although any hydroxylic solvent such as 15–60% of an aqueous lower alkanol can be used. Ethanol or n-propanol are preferred because of solubility and temperature considerations.

Where the organic N-oxide compound does not contain an azo group, such as the one of Example 8, the preferred solvent is water and a small catalytic amount of acid may be used. If an azo group is present, however, the reaction solution must be neutral.

It is pointed out that in the case of organic N-oxide compounds containing azo groups, any free amino group present in the compound must be first protected, e.g., by acetylation, in order to facilitate the reaction.

The following examples illustrate this invention without being limiting.

Example 1.—Reduction of heterocyclic N-oxide with iron and activated carbon

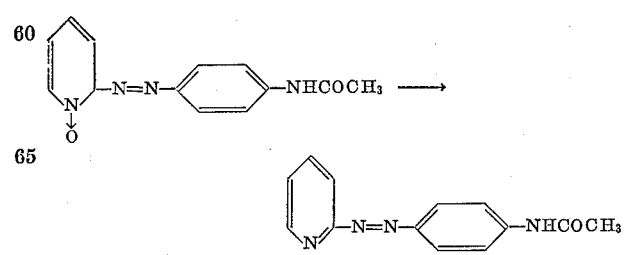

To 345 ml. 30% ethanol is added 25.6 grams of 2-(4-acetylaminophenylazo)-pyridine-N-oxide. With efficient stirring there is added 27.4 g. 60-mesh chemical iron and 1 g. activated carbon (4% on the weight of the N-oxide). The whole is heated to reflux within twenty minutes and held at reflux until reduction (deoxygenation) is complete. The progress of the reduction is followed by spectrophotometric measurement of UV absorptions at the maxima for the acetylated base and the acetylated base oxide.

Progress of the reduction (deoxygenation) is 35.5% complete in 3 hours
78% complete in 6 hours
100% complete in 22 hours The end product when quaternized with methyl iodide, dyes polyacrcylonitrile a bright yellowish orange. However, if first deacetylated and then quaternized with dimethyl sulfate, it dyes polyacrylonitrile bright red.

Example 2.—Effect of iron in the absence of activated carbon

In the preceding process when the activated carbon is omitted, the reduction is much slower.

26% complete in 3.5 hours
33% complete in 6 hours
76% complete in 22.5 hours
91% complete in 30 hours Example 3.—Effect of activated carbon in the absence of Iron If in Example 1 the iron is omitted and the activated carbon increased to a quantity equal to the N-oxide, 25.6 g., the amount of N-oxide reduced (deoxygenated) is only 2% in 23½ hours.

Example 4.—Reduction using very finely divided iron

If in Example 1, instead of 60-mesh iron, 325-mesh iron is used, the rate of reduction (deoxygenation) is as follows:

35%, 3 hours
56%, 6 hours
100%, 24 hours

Example 5.—Reduction scaled up to pilot plant size

To a mixture of 1173 lbs. ethanol and 1732 lbs. water is added 275 lbs. of the N-oxide of Example 1 and 11 lbs. activated carbon (Darco S-51). With efficient stirring, 119 lbs. of 60-mesh chemical iron is added. The whole is heated with stirring to reflux and held at reflux until deoxygenation is complete. At the end of 3½ hours, 45% of N-oxide has been reduced. 50 lbs of 60-mesh chemical iron is added. At the end of the sixth hour of heating at reflux 60% of N-oxide has been reduced. Another 50 lbs. of 60-mesh chemical iron is added. At the end of 9 hours 50 min., 86% N-oxide has been reduced. 75 lbs. 60-mesh chemical iron is added and the mixture heated at reflux until reduction is complete. 100% reduction occurs in 15½ hours.

Example 6

If the carbon used in Example 4 is varied as shown in the table, the following result is obtained.

PERCENT REDUCTION (DEOXYGENATION)

| Hours | A<br>4% Act.<br>Carbon<br>(Example 4) | B<br>1% Act.<br>Carbon | C<br>1%<br>Graphite | D<br>20%<br>Graphite |
|---|---|---|---|---|
| 3 | 35 | 35 | 21 | 21 |
| 6 | 56 | 49 | 24 | 68 |
| 22 | | | | 98 |
| 22.5 | | 100 | 54 | |
| 24 | 100 | | | |
| 30 | | | 70 | |

Example 7.—Change from ethanol to n-propanol

To a mixture of 185 g. n-propanol and 378 g. water is added with stirring 45.2 grams of the N-oxide of Example 1; 175 g. activated carbon (Darco S-51) and 48.4 g. 60-mesh chemical iron is added with efficient stirring. The whole is heated at reflux (90.5° C.). Deoxygenation is complete in four hours.

Test for presence of deoxygenated product shows the progress of the reduction to be:

42.5% complete in 1 hour
89% complete in 2 hours
94.5% complete in 3 hours
100% complete in 4 hours Example 8.—Reduction of an aryl nitro group with iron and activated carbon

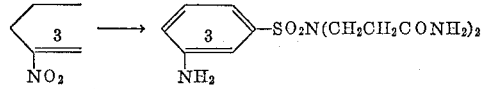

A charge of 80 g. 60-mesh iron, 6 g. activated carbon (catalyst) 172.2 g. 3-nitro-N,N-bis(2-carbamoylethyl) benzene sulfonamide, 16 ml. glacial acetic acid and 1920 ml. water is heated to 90–95° C. with efficient stirring and held at this temperature with stirring until reduction is complete (about one hour). It is cooled to 75–80° C. For solution, 22 g. sodium carbonate is added to a positive test on Brilliant Yellow indicator paper. The solution of amine is clarified as follows: there is added 6 g. activated carbon (as absorbent and not as catalyst) and 25 g. of a filter aid (diatomaceous earth). Filtration is at 80° C. and the residue is washed with 425 ml. hot water which is added to the filtrate. The combined filtrates containing the amine product is cooled to 5° C. The precipitated product, 4-amino-N,N-bis(2-carbamoylethyl)benzene sulfonamide is filtered, washed with 400 ml. cold water and dried. Yield of product is 127.2 g. (81.2% of theory) melting at 186–187° C.

Example 9.—Effect of iron in the absence of activated carbon

When the process of Example 8 is run omitting the 6 grams of activated carbon in the reduction mixture, a yield of only 48.4% of the desired product is obtained (i.e. reduction of the nitro group is only 48.4% completed).

While the present invention has been described and illustrated herein by means of specific embodiments and examples thereof, it is not intended that the scope of the invention be limited in any way thereby, but only as indicated in the following claims.

I claim:

1. A process for the reduction of an organic nitrogen oxide compound to the corresponding amine thereof which comprises (1) forming a solution of said nitrogen oxide compound employing water or aqueous lower alkanol as solvent (2) suspending in said solution (a) at least about 1 mole of iron particles per mole of nitrogen oxide oxygen in said nitrogen oxide compound and (b) from about 1 to about 20%, based on the weight of said nitrogen oxide compound, of activated carbon particles and (3) heating said solution at substantially reflux temperature for a time to effect the reduction reaction; said nitrogen oxide compound being selected from the group consisting of
(1) a heterocyclic nitrogen monoxide compound selected from (a) pyridine-1-oxide, (b) quinoline-1-oxide and (c) a or b having a ring substituent selected from alkyl, alkoxy, halogeno, methylsulfonyl, 2-phenylazo, 2-methoxyphenylazo, 2-naphthylazo, 2-(3-methylphenyl)azo, 2-p-dimethylaminophenylazo, biphenylylazo and 2-(4-acetylaminophenyl)azo;
(2) a heterocyclic nitrogen dioxide compound selected from phenazine dioxide, quinoxaline dioxide, 4-nitropyridine and 4-nitroquinoline.
(3) an aromatic nitrogen monoxide compound selected from nitrosobenzene, nitrosonaphthalene, 4-(dialkylamino)nitrosobenzene, p-nitrosophenol and 1-nitroso-2-naphthol, and (4) an aromatic nitrogen dioxide compound selected from nitrobenzene, chloronitrobenzene, nitrophenetidine, nitrobenzenesulfonic acid, 1- and 2-nitronaphthalene and mono- and disulfonic acids thereof, 3-nitro - N,N-bis(2-carbamoylethyl) benzene sulfonamide, mono- and dinitroanthraquinone and mono- and dinitroanthraquinone having a ring substituent selected from halogen, sulfo and hydroxy.

2. A process according to claim 1 wherein the organic nitrogen oxide compound is 3-nitro-N,N-bis(2-carbampyridine-N-oxide, the solvent is aqueous lower alkanol and the solution is neutral.

3. A process according to claim 1 wherein the organic nitrogen oxide compound is 3-nitro-N,N-(bis(2-carbamoylethyl)benzene sulfonamide, the solvent is water and the solution contains a small catalytic amount of acetic acid.

References Cited
UNITED STATES PATENTS

| | | | |
|---|---|---|---|
| 1,530,392 | 3/1925 | Morrell | 260—580 XR |
| 1,306,512 | 6/1919 | Andrews | 260—580 XR |
| 1,451,666 | 4/1923 | Miller | 260—580 |
| 2,927,116 | 3/1960 | Davoll et al. | 260—580 XR |
| 3,041,377 | 6/1962 | Harast | 260—580 |

OTHER REFERENCES

Hazlet: J. Am. Chem. Soc., vol. 66, pp. 1781–1782 (1944).

FLOYD D. HIGEL, *Primary Examiner.*

UNITED STATES PATENT OFFICE
CERTIFICATE OF CORRECTION

Patent No. 3,386,991　　　　　　　　　　　　　　June 4, 1968

Samuel Michael Gerber

It is certified that error appears in the above identified patent and that said Letters Patent are hereby corrected as shown below:

Column 5, line 10, "3-nitro-N,N-bis(2-carbam-" should read -- 2-(4-acetylaminophenylazo) --.

Signed and sealed this 14th day of October 1969.

(SEAL)
Attest:

Edward M. Fletcher, Jr.　　　　　　　　　WILLIAM E. SCHUYLER, JR.
Attesting Officer　　　　　　　　　　　　　　Commissioner of Patents